US007305445B2

(12) United States Patent
Singh et al.

(10) Patent No.: US 7,305,445 B2
(45) Date of Patent: Dec. 4, 2007

(54) INDIRECT DISPOSABLE EMAIL ADDRESSING

(75) Inventors: Tarvinder P. Singh, Woodinville, WA (US); Vivek Sharma, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 10/352,451

(22) Filed: Jan. 28, 2003

(65) Prior Publication Data
US 2004/0148358 A1 Jul. 29, 2004

(51) Int. Cl.
G06F 15/173 (2006.01)
(52) U.S. Cl. .................. 709/206; 709/224; 709/229; 709/223; 709/207
(58) Field of Classification Search ............... None
See application file for complete search history.

(56) References Cited

U.S. PATENT DOCUMENTS

| | | | |
|---|---|---|---|
| 5,822,526 A | 10/1998 | Waskiewicz | 395/200.36 |
| 6,199,102 B1* | 3/2001 | Cobb | 709/206 |
| 6,266,692 B1 | 7/2001 | Greenstein | 709/206 |
| 6,463,533 B1 | 10/2002 | Calamera et al. | 713/163 |
| 6,546,416 B1* | 4/2003 | Kirsch | 709/206 |
| 6,591,291 B1* | 7/2003 | Gabber et al. | 709/206 |
| 6,973,481 B2* | 12/2005 | MacIntosh et al. | 709/206 |
| 7,072,943 B2* | 7/2006 | Landesmann | 709/206 |
| 2002/0016735 A1* | 2/2002 | Runge et al. | 705/14 |
| 2003/0158888 A1* | 8/2003 | Bjorklund et al. | 709/201 |
| 2003/0204569 A1* | 10/2003 | Andrews et al. | 709/206 |
| 2003/0220978 A1* | 11/2003 | Rhodes | 709/206 |
| 2004/0003283 A1* | 1/2004 | Goodman et al. | 713/201 |
| 2004/0015554 A1* | 1/2004 | Wilson | 709/206 |
| 2004/0201625 A1* | 10/2004 | Karamchedu et al. | 345/752 |
| 2004/0205173 A1* | 10/2004 | Hall | 709/223 |
| 2004/0243844 A1* | 12/2004 | Adkins | 713/201 |

OTHER PUBLICATIONS

Mazzucca, Marcella; "*Email Security: Dangerous Waters Ahead,*" Secure Computing (International Edition), vol. August 2001, pp. 25-30.

Champeon, Steven; "*Save Your Site From Spambots: Techniques to Prevent Address Scraping,*" WEB Techniques, vol. 6, No. 8, Aug. 2001, pp. 41-43.

(Continued)

*Primary Examiner*—Bunjob Jaroenchonwant
*Assistant Examiner*—Dohm Chankong
(74) *Attorney, Agent, or Firm*—Workman Nydegger (57) ABSTRACT

Methods, systems, and computer program products for reducing unsolicited electronic messages by using immutable email identities in place of traditional email addresses. Over any of various protocols, an address generation server receives an electronic message requesting a disposable address for an intended recipient having an immutable email identity. The request also includes a return address for the sender, which discourages unsolicited messages because most senders of unsolicited messages prefer to remain anonymous. After receiving the request, the address generation server creates the disposable electronic message address, which may be limited in use. A challenge must be completed before the address may be discovered or used. This challenge further discourages unsolicited electronic messages because it imposes a burden that many senders of unsolicited messages are unwilling to bear.

39 Claims, 7 Drawing Sheets

OTHER PUBLICATIONS

Curtin, Matt; "*Shibboleth: Private Mailing List Manager,*" Proceedings of the 9th USENIX Security Symposium, vol. 14-17 Aug. 2000, pp. 263-275.

Hall, Robert J.; "*How to Avoid Unwanted Email,*" Communications of the ACM, vol. 41, No. 3, Mar. 1998, pp. 88-95.

Lukovitz, Karlene; "*The Wide (Wild) World of Email Permissions,*" Circulation Management, vol. 15, No. 11, Nov. 2000, pp. 49-52.

"*Spam Free Email Accounts,*" <http://www.ChooseYourMail.com>, visited Jan. 28, 2003.

"*Spam Free Email Accounts,*" <http://www.ChooseYourMail.com/faq.htm>, visited Jan. 28, 2003.

"*Spam Free Email Accounts,*" <http://www.ChooseYourMail.com/howitworks.htm>, visited Jan. 28, 2003.

\* cited by examiner

INDIRECT DISPOSABLE EMAIL ADDRESSING

CROSS-REFERENCE TO RELATED APPLICATIONS

N/A

BACKGROUND OF THE INVENTION

1. The Field of the Invention

The present invention relates to electronic message systems. More particularly, the present invention relates to methods, systems, and computer program products for reducing unsolicited messages in an electronic message system.

2. Background and Related Art

Unsolicited electronic messages, also known as spam, are a significant problem for users of electronic message systems, such as electronic mail systems. Whether in a personal or a business context, spam consumes both computing and human resources. For some systems, spam may account for anywhere from one-third to one-half of all email traffic, and in extreme cases, spam may be responsible for 80% of email traffic or more. Although the cost in computing resources is significant, the amount of time users waste in reviewing and deleting spam can represent an unacceptable drain on productivity or leisure time.

The problems caused by spam have lead to reluctance on the part of users to disclose their email addresses in many circumstances, such as on a web site or in publications. Once an address is disclosed, it can be discovered by web crawlers initiated by spammers (i.e., those who send spam) and distributed to email marketers. Much like telemarketing, spam is viewed by many as intrusive and undesirable. Users are then forced to sift through massive amounts of irrelevant spam and/or deploy expensive tools and resources to eliminate as much spam as possible.

Email aliasing is a widely understood method that email users employ to protect their primary or actual email address. An email alias is a public identity (other than the primary address) for a user. The alias can take any form, but usually has some relationship to the primary address. For example, "firstinitial.lastname@company.com" may be used as an alias for a user's primary address "firstname.lastname@company.com" which the user ordinarily does not disclose or only discloses to trusted parties. Users with no control over their email server may achieve the same result by creating multiple email accounts on public domain web servers (hotmail, yahoo, etc.) to keep their primary email address from being discovered by spammers. Some users may have separate email accounts for friends, family, business, and for submitting to web sites. If an alias or address becomes overloaded with spam, the user simply chooses another alias or address, but usually retains the same primary address.

These simple addressing schemes solve a few problems for a short period of time, but they create larger problems of manageability and usability. Eventually they are no better in reducing spam than using just one address, and they introduce new problems. If an address or alias is given to multiple parties, and some of the parties are untrusted, the entire address or alias is prone to spam. These addresses or aliases are hard to delete because subscriptions to web sites and the user's contacts must be updated. It is worth noting that in using multiple addresses and aliasing, the responsibility of keeping an address spam-proof lies with parties other than the user.

Aliasing may present further problems when emailing multiple groups of people. For example, if a sender has two aliases, one each for family and friends, it hard to choose the appropriate alias when sending an email to recipients who are both family and friends. Perhaps a new "friends and family" alias could be created, but at some point the combinations of groups becomes too large to manage. This problem may be compounded if a temporary alias is created for a specific email or series of emails. Recipients may interpret the new alias as an updated email address and add the temporary alias to their address book.

Another problem with multiple addresses or aliases is that once an address or alias has been disabled (perhaps because it was compromised) the user can no longer be contacted. This represents a serious problem for those who publish their email address in some way, such as on business cards, letterhead, in articles, to business partners, etc. Once the address is disabled, no further contact can occur. Accordingly, methods, systems, and computer program products that reduce unsolicited electronic messages, but allow permanent or long-term identities to exist, are desired.

BRIEF SUMMARY OF THE INVENTION

It should be appreciated that this summary is intended only to provide a brief overview of the invention and should not be interpreted as limiting its scope, which is defined by the claims. The present invention reduces unsolicited electronic messages by creating one or more disposable electronic message addresses for an email user while avoiding the need to disclose or have a permanent immutable email address, such as a traditional email address that identifies the email account of a particular user at a particular domain. Since there is no need for an immutable email address, spammers (i.e., senders of unsolicited electronic messages) can only harvest (typically) short-lived and controllable disposable addresses. For ease of use and easier memorization, email users are still given an immutable identity, but the identity is used to request disposable addresses and in many circumstances cannot be harvested for sending spam.

This identity uniquely identifies an address generation server. The address generation server receives an electronic message that includes a request address for an intended recipient and a return address for the sender of the electronic message. The address generation server verifies that the intended recipient is known to the address generation server and creates a disposable electronic message address.

The email message response with the disposable electronic message address is formatted such that a challenge must be completed before the address may be used or discovered. This challenge discourages use of the disposable electronic message address for sending unsolicited electronic messages. The disposable electronic address and challenge are sent to the return address included in the request so that the sender, after completing the challenge, can use the disposable electronic message address to send electronic messages to the intended recipient.

Unsolicited electronic messages are discouraged in two ways. First, senders of unsolicited electronic messages generally rely on anonymity and are unwilling to supply a valid return address. Since the disposable electronic message address is sent to the return email address, a sender of unsolicited electronic messages who spoofs (i.e., conceals) their email addresses usually will never receive it.

Requests for a disposable address may also be made using a web based protocol. In web-based implementations, the request may require a certificate or some other authentication information to assure the validity of an electronic message address included in the request. Here too, however, the disposable electronic message address could be returned to the supplied electronic message address rather than directly through the web interface and may include a challenge. It should be noted that web protocols may be used for exchanging email messages, and that the present invention may be practiced using any (or combinations) of various protocols for exchanging electronic messages.

Second, senders of unsolicited electronic messages generally are unwilling to expend significant resources to send unsolicited email messages. Accordingly, the present invention requires email senders to expend some resources (the amount of which may vary depending on the circumstances) in solving or completing a challenge before discovering and being able to use an intended recipient's disposable address. On the other hand, bona fide senders typically send few enough messages that the overhead associated with a challenge will not preclude them from reaching the intended recipient. Note that in practicing the present invention, the burden of discouraging unsolicited electronic message has shifted from the intended recipient, who previously had to manage multiple addresses, employ sophisticated software tools, and sift through large numbers of electronic messages, to the sender, who now must be willing to be identified and complete a challenge of some sort.

In some implementations, the intended recipient may be notified of the request for the disposable address. As an added measure of protection, the disposable electronic message address may be limited to use only by the requester. For example, an explicit allow list may be associated with the disposable electronic message address and senders who do not appear on the allow list will be precluded from using the disposable electronic message address for the intended recipient. Expiry criteria also may be associated with the disposable electronic message address to limit its use. These properties on the disposable addresses may be edited (using a client) at any time after the address is in use.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for reducing unsolicited electronic messages by avoiding use of a permanent immutable email address that needs to be shared with others. Embodiments of the present invention may comprise one or more special purpose and/or one or more general purpose computers including various computer hardware, as discussed in greater detail below.

Figure 1A:
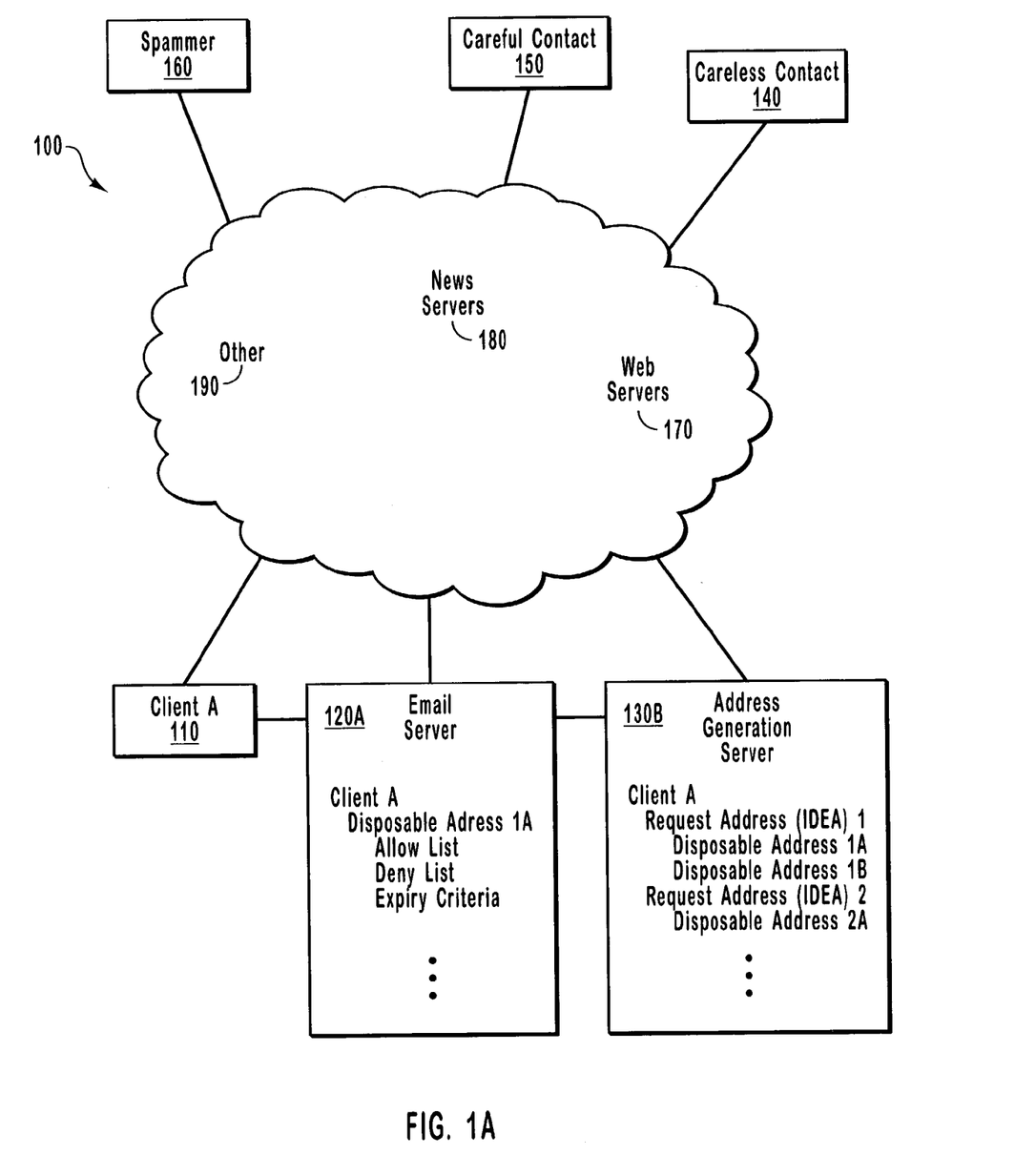
FIGS. 1A-1B illustrate implementations of the present invention for email messages.

FIG. 1A illustrates a network 100 for exchanging a variety of electronic content including email messages. For example, the network includes web servers 170, news servers 180, and other servers 190. Email server 120A and address generation server 130A are also connected to the network. (It should be understood that email server 120A and address generation server 130A may be implemented in separate server environments or the same server environment, as described in more detail below with respect to FIG. 1B.) Four entities are shown in FIG. 1A: client A 110, careless contact 140, careful contact 150, and spammer 160.

Spammer 160 has several options for harvesting an email address that corresponds to client A 110. Client A 110 may participate in a newsgroup hosted by news servers 180. Typically, posting messages to a newsgroup includes providing an email address for off topic or private exchanges that do not involve the entire newsgroup. Spammer 160 may use software designed to retrieve content from news servers 180 and extract email addresses. Traditionally, to avoid spammer 160, client A 110 supplies a false ("spoofed") address. In some circumstances, the address may be close to the real address, such as by pre-pending a phrase like "remove_this_to_respond" so that bona fide participants in a newsgroup can respond, but automated software cannot. The pre-pended phrase illustrates a common characteristic of many spammers—they are generally unwilling to expend much additional effort or expense to harvest email addresses.

Alternatively, spammer 160 may pay a web site hosted by web servers 170 for email addresses of entities visiting, using, or subscribing to the site. While some sites offer relatively strict privacy policies, others do not. Furthermore, even though client A 110 and careful contact 150 exercise discretion in sharing the email address of client A 110, careless contact 140 may be less vigilant. For example, careless contact 140 may send a greeting card to client A 110 that requires careless contact 140 to disclose the email address of client A 110 with a web site that sells subscriber or known email addresses.

There are, of course, too many scenarios for harvesting email addresses to be listed here, and new ways are likely to be developed by spammers in the future. It should also be recognized that client A 110 may want an easily discoverable email address. For example, the email address may be used in advertising, on business cards, published on a web page, etc., or included within an article or document authored by client A 110.

FIG. 1A illustrates an example embodiment of the present invention for reducing unsolicited electronic messages or spam by eliminating the need for client A 110 to have a permanent immutable email address. This is accomplished by advertising or making public an electronic address that requests a disposable electronic address for client A 110. More detailed examples are provided with reference to FIGS. 2A-2B and 3A-3B.

Note that address generation server 130A includes request address 1 and request address 2 for client A 110. These request addresses look like normal email addresses, but are directed to address generation server 130A and interpreted as a request for a disposable address. For simplicity, the request address may be referred to below as an "indirect disposable email address" ("IDEA"). Both request address 1 and request address 2 are unique to client A 110 and therefore identify client A 110 as the intended recipient. Disposable address 1A and disposable address 1B are associated with request address 1 and disposable address 2A is associated with request address 2. Other (or fewer) request addresses and disposable addresses may be associated with client A 110. For example, FIG. 1A shows two request addresses for client A 110, each having associated disposable addresses, but client A 110 may have one request address or several. Directories list the IDEA of a user rather than disposable addresses or traditional email addresses.

A notation like <HEXGUID>.<IDEA> may be used for representing disposable addresses. In other words, a disposable address for an IDEA like user@domain.com will look like <HEXGUID>.user@domain.com. This notation may be helpful in managing disposable addresses and would allow both compatible and incompatible clients, as discussed below in connection with FIGS. 2A-2B, to decipher the IDEA from any disposable address. While allowing anyone to decipher the IDEA given the disposable address may appear to be a concern, it is not, because the IDEA only allows a user to obtain a disposable address after completing a challenge. Anyone willing to complete the challenge should be entitled to a disposable address. However, as described below, steps may be taken to assure that an unauthorized user is prevented from using a disposable address that has been generated for another user, as may be appropriate for the circumstances.

Address generation server 130A returns the disposable addresses it generates to the requestor so that the requester may send electronic messages to client A 110. A challenge is included with the disposable addresses to discourage spammers. Imposing some burden on the spammer can be a significant deterrent. Address generation server 130A also requires the requester to be identified. For example, address generation server 130A may require a return email address for the requestor and/or credentials to authenticate the requestor's identity. Preventing spammers from being anonymous also can be a significant deterrent.

Email server 120A shows disposable address 1A associated with client A 110. Disposable address 1A includes an allow list, a deny list, expiry criteria, etc. Other information also may be associated with disposable address 1A and other disposable addresses may be associated with client A 110. An allow list identifies senders who are allowed to use the disposable address. A deny list identifies senders who are prohibited from using the disposable address. Expiry criteria may limit the lifetime of a disposable address, such as by limiting the number of messages that may be received by the address, specifying a time after which the address may no longer be used, specifying an inactivity time after which the address will be disabled. (Similar lists may be included in address generation server 130A to impose similar constraints on request addresses.)

Figure 1B:
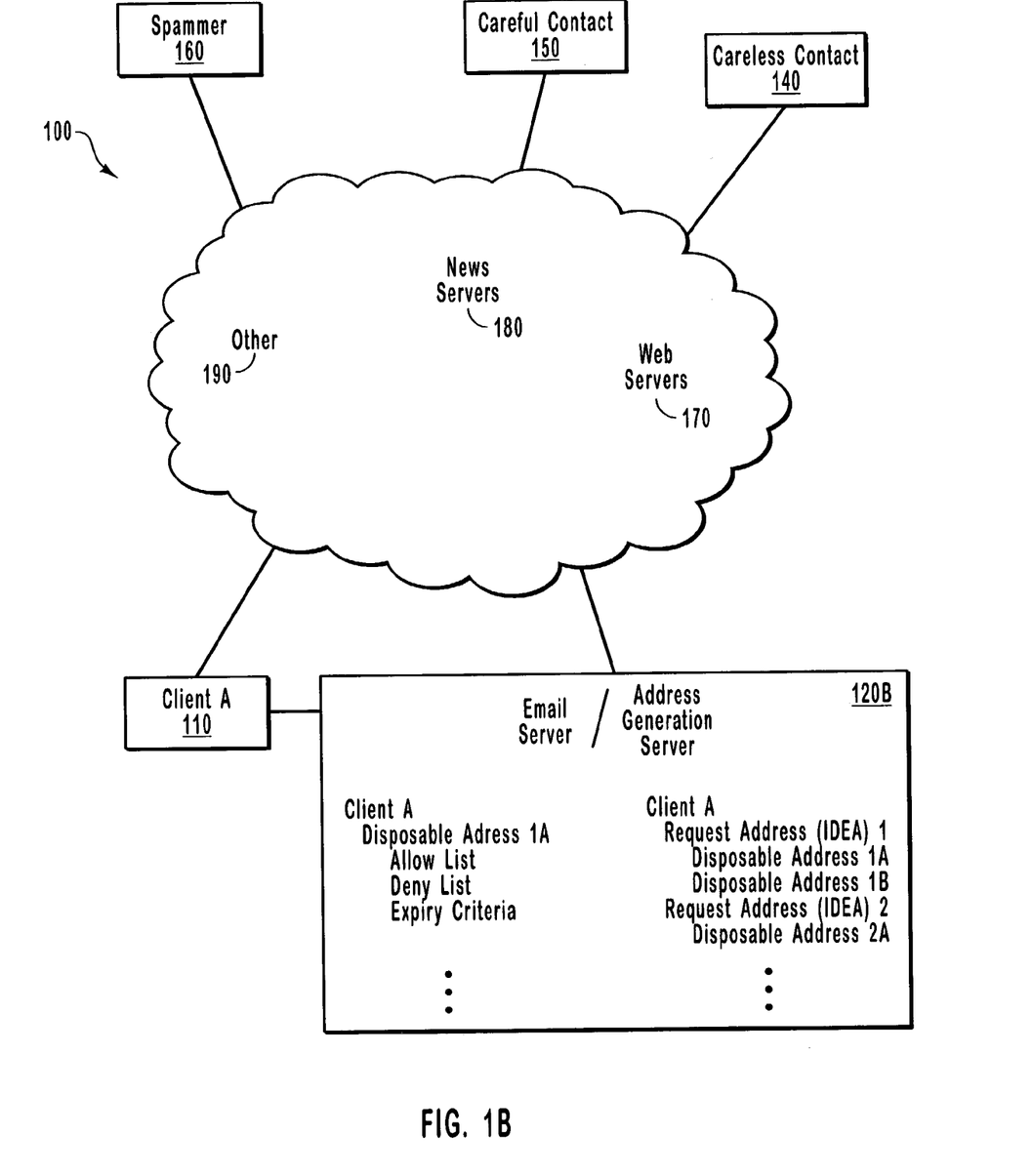

FIG. 1B illustrates an example embodiment of the present invention where email server 120B also operates as the address generation server. The other items shown in FIG. 1B are as described above with reference to FIG. 1A. It should be noted in particular that the address generation server and email server may be implemented on completely separate (e.g., different IP addresses) computers, on the same computer as distinct processes, on the same computer within the same process, etc. Accordingly, FIGS. 1A-1B and their corresponding descriptions should not be interpreted as necessarily requiring or imposing any specific hardware implementation in order to practice the present invention. It should also be noted that an email and/or address generation server may perform a variety of other tasks in addition to processing email messages and/or generating disposable addresses.

It should be recognized that the implementations illustrated in FIGS. 1A-1B allow client A 110 to publicize an email identity (an IDEA) to facilitate contact, but make it burdensome for use by spammers to discourage unsolicited electronic messages. Bona fide senders also share this burden, but in the case of a few messages, the burden is not too onerous. In the case of spammers, however, who send large quantities of unsolicited electronic messages, the burden is significant enough to reduce or perhaps even eliminate unsolicited electronic messages.

Figure 2A:
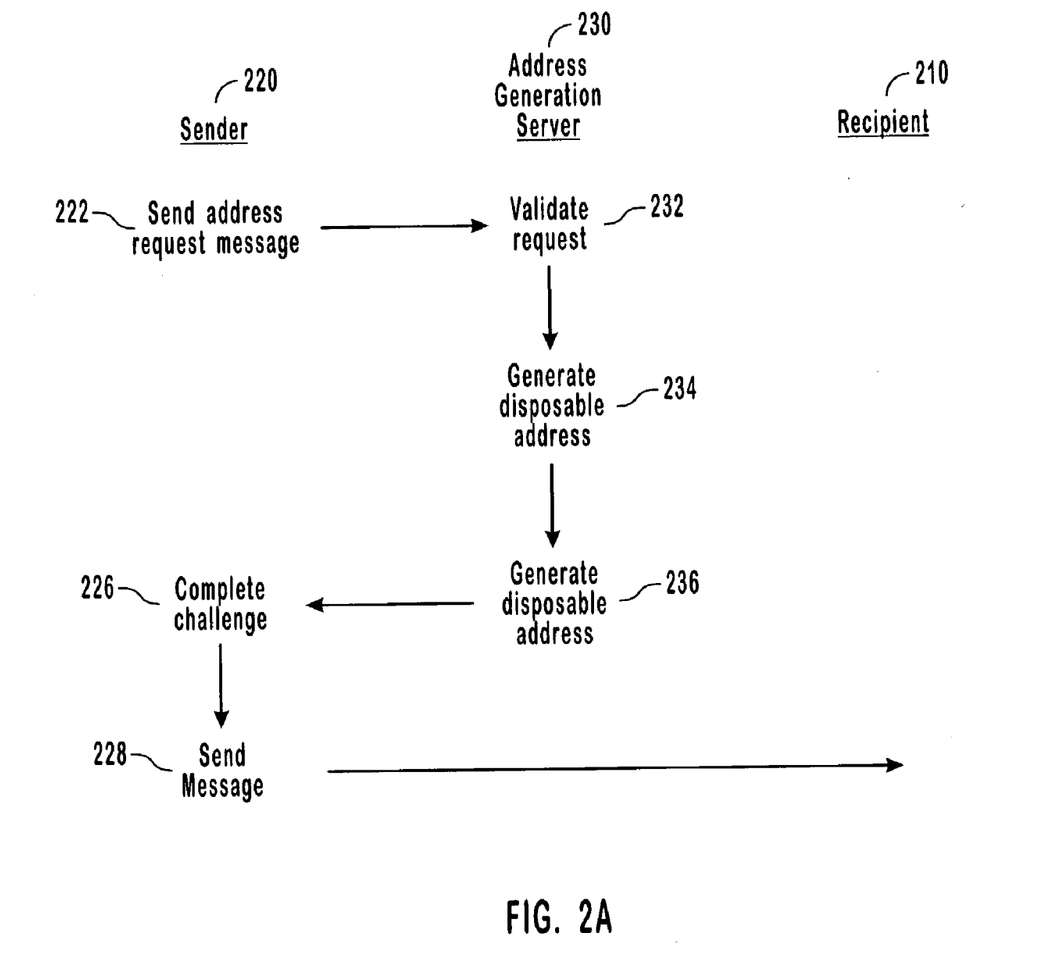
FIGS. 2A-2B show where certain processing steps occur in example implementations of the present invention.
Figure 2B:
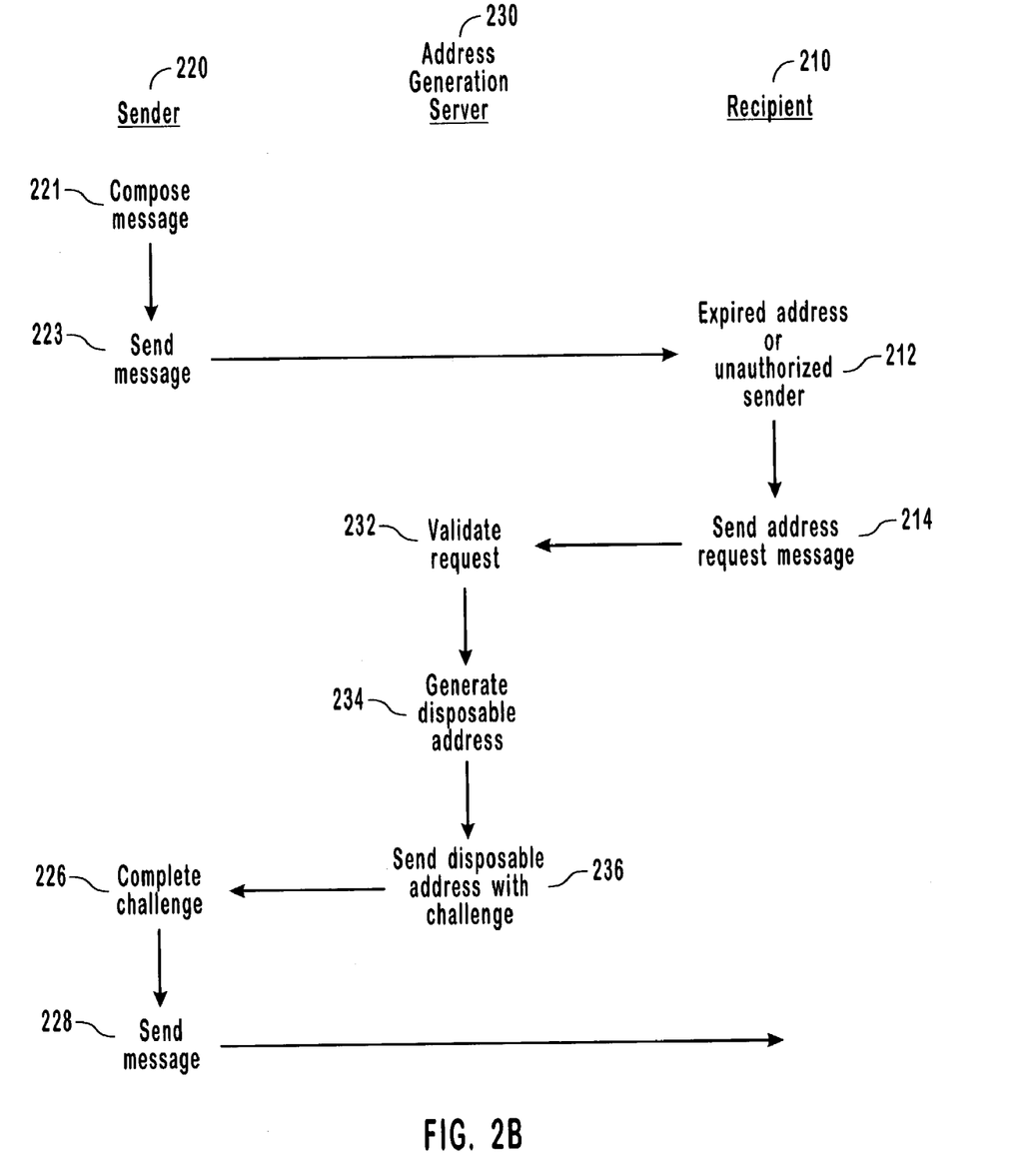

FIGS. 2A-2B show where certain processing steps occur in an example implementation of the present invention. With particular reference to FIG. 2A, sender 220 sends (222) an address request message. The request message may take any of a variety of forms, using email protocols, such as SMTP, web-based protocols, such as HTTP and SOAP, wireless protocols for hand-held devices, or any other protocols suitable for electronic messages. The request message, accordingly, may take the form of an SMTP conversation, a separate email message, a form request submitted over the web, etc. Therefore, it is worth noting that the term "electronic message" should be interpreted broadly to encompass a wide range of message types, including messages or portions of messages composed by a sender, and messages that may be exchanged as part of a communication protocol, which may or may not include messages or portions of messages composed by a sender.

The address request identifies the intended recipient (which may, for example be inferred from the request address, since the request address, such as an IDEA may be associated with a particular client, or may be specified explicitly, depending on the particular protocol used and other factors) and the sender. Address generation server 230 receives and validates (232) the request. For example, the server verifies that the intended recipient is known to the address generation server, that the request is formatted properly, that the intended recipient is authorized to have disposable addresses generated, and the like. In one embodiment, a request may include a "mailfor" header to indicate that a message is a request for a disposable address.

In a browsing context, a uniform resource identifier using a "mailfor" prefix (similar to the existing mailto: emailalias@domain.com notation) may be used to request a disposable address for an immutable identity. A browser would interpret "mailfor" just as it does the "mailto" prefix—by invoking the mail client. The mail client (depending on its sophistication and support) may recognize that a "mailfor" prefixed address represents an immutable identity and request a disposable address (e.g., as described here with reference to FIG. 2A) or send an email to the immutable identity, which the address generation server interprets as a request for a disposable addresses (e.g., as described further below with referenced to FIG. 2B).

Address generation server 230 then generates (234) a disposable address and sends (236) the disposable address to the sender 220 with a challenge to complete before the disposable address may be used. (As indicated above, address generation server 230 also may receive email for the disposable addresses it generates.) Challenges may take many forms, including for example computational challenges, cost challenges, and human challenges. Computation challenges require some type of processing, such as a decryption operation. By demanding computation resources, spammers are discouraged from using disposable addresses. A cost challenge involves some type of financial compensation, such as a direct financial payment or a credit of some sort. For example, a recipient may be willing to read unsolicited electronic message to acquire points or credits that may be exchanged for something of value. A human challenge generally requires some form of human interaction and generally is not easily automated. For example, the disposable address may be returned as an image or puzzle that is relatively easy for a human to recognize or solve, but may not be easily recognized or solved by software. Of course the above challenges may be combined, such as where computational challenges are varied so that a human must examine the challenge to determine what course of action should be taken. If spammers still succeed in obtaining an address, the challenge may be increased for subsequent requests as a further technique to reduce unsolicited electronic messages.

The sender 220 completes (226) the challenge to obtain the disposable address. With the disposable address, sender 220 sends (228) a message to the recipient 210. Although not shown, prior to delivering the email to the intended recipient (e.g., placing the email in the intended recipient's inbox) the intended recipient's email server may verify that the disposable address is valid, such as by checking a database of valid disposable addresses or executing an algorithm that is related to an algorithm used for generating disposable addresses. In some cases, such as when sender 220 has been identified as a spammer, address generation server 230 may mark a generated address as a null or sink address. The null or sink address looks like an actual address to sender 220, but allows for received messages to be deleted without interaction from the intended recipient. Because the null or sink address looks like any other disposable address and the sender 220 does not know that it has been marked as a null address, sender 220 will continue to use the address, and not burden the address generation server 230 with additional requests for disposable addresses for the intended recipient. It should be recognized that the address request message sent to address generation server and the message sent to the recipient may be separate messages, the same message, or a combination of the two. FIG. 2B, illustrates one example of this point.

Sender 220 composes (221) a message and sends (223) the message to recipient 210. However, the address to which the composed message was sent is either expired or unauthorized (212). For example, as described above, a disposable address may have an associated allow list or deny list that precludes use by sender 220, or the disposable address may have expired, based either on expiry criteria or by having been disabled because it has been subjected to spam. In this case, recipient 210 (e.g., the email server or client for recipient 210) sends (214) an address request message (on behalf of original sender) to address generation server 230. Note that under this scenario, using the present invention the recipient may be contacted using an old disposable address, whereas in conventional email systems, the email would be returned to sender 220 as undeliverable.

The remaining processing essentially mirrors the description of FIG. 2A above. Address generation server validates (232) the request, generates (234) a disposable address, and sends (236) the disposable address to sender 220 with a challenge. Sender 220 completes (226) the challenge and sends (228) the message to recipient 210. Depending on the software used by sender 220, completing (226) the challenge and sending (228) the message may be automated. Alternatively, address generation server 230 may return the composed message to sender 220 with instructions that the challenge must be completed to obtain a new disposable address, which then can be used to resend the composed message. Where both sender and recipient use disposable addresses, a challenge scheme may be implemented that allows for automated mutual challenges so that both systems are not waiting for challenges to be completed before delivering messages.

When sender 220 composes (221) an electronic message, a disposable address previously created for the intended recipient may be added to identify the sender, and if one does not exist, a new disposable address may be created. Where multiple recipients are listed, a new disposable address may be created for the group, or a disposable address for one member of the group may be used for all, and then the others in the group may be added to the allow list for that disposable address. If a recipient receives a message from a sender who is not on the allow list, but another recipient of the message is on the allow list, the allow list may be automatically updated to include the sender who is not on the allow list.

Emails originating and terminating within a trusted domain may be delivered to the intended recipients without the need for completing any challenges or generating disposable addresses. For example, the handshake to obtain disposable addresses (e.g., as illustrated in FIG. 2A) is a null operation and instead simply delivers the email to the intended recipient, such as by placing the email in the intended recipient's inbox. The "from" and "to" fields for emails in the trusted organization will contain the public or immutable email identity, rather than disposable addresses. Essentially, this situation behaves much like traditional email, except that if domains are ever determined to be untrusted, email communication can fall back to disposable addressing, and in most cases, users will not notice any difference.

It is worth noting that in using the present invention, a sender may not notice or realize that the intended recipient ultimately is being contacted through a disposable address. The sender may have a public identity or IDEA for the intended recipient that represents a request for a disposable address, either because the public identity is directed to an address generation server or because other information associated with the public identity identifies the address as such. When composing an electronic message, the sender uses the public identity or IDEA as the address of the intended recipient. From the sender's perspective, the message is simply composed and sent.

The address generation server receives the message and interprets the message as a request for a disposable address. The disposable address for the recipient is generated and returned to the sender with a challenge. The sender's client software for electronic messages completes the challenge, obtains the disposable address, and sends the message to the intended recipient using the disposable address. By including sufficient information with exchanged messages, perhaps in headers, clients who are aware of the disposable addressing scheme can perform these operations automatically. Where a client is aware that an address represents an IDEA (a request for a disposable address), the client may negotiate with the address generation server for a disposable address without sending the message composed by the sender. Then, once the disposable address is obtained, the client can automatically send the message to the intended recipient. While waiting for the disposable address, the message may be placed in an outbox for composed messages that are waiting to be sent. After a sender has obtained a disposable address for an intended recipient, the disposable address could be stored and automatically substituted for the IDEA in subsequent messages without having to request the disposable address from the address generation server.

It should also be appreciated that negotiating for a disposable address may occur between two or more clients, between clients and servers, or between servers. In some circumstances, a person giving out an IDEA will have an email server (and client) that supports disposable addressing and can negotiate on behalf the sender. For example the email server could receive messages directed to an IDEA, negotiate for a new disposable address as necessary or substitute a known disposable address for the IDEA, and send the message to the intended recipient without the sender knowing that the IDEA is not an actual email address.

When an email server negotiates for a disposable address, the email server may be indistinguishable from an email client, at least from the perspective of the address generation server. In some implementations, however, it may be desirable to distinguish between email clients and email servers. For example, in selecting challenges, it may be appropriate to consider whether a request comes from a client or server, but often, the more important consideration will be whether the requestor supports IDEA and is, therefore, able to automate some or all of the processing. Accordingly, the use of terms like client and server should be interpreted broadly and not necessarily as mutually exclusive. A server may operate as a client in one context and as a server in another, just as a client may operate as a server in one context and as a client in another. Therefore, a server or client requesting a service from another server may be appropriately referred to as a client, and a client providing a service to another client or server may be appropriate referred to as a server.

Example embodiments of the present invention may work with clients and servers that do not support IDEA. For example, consider sending an email with and incompatible client and an incompatible server. In most cases, the sender will compose an email and send it to the address generation server thinking that the IDEA is a real email address. The address generation server will bounce the email back to the client with a human challenge that when solved will give the user instructions on forwarding the email to a disposable address. Such a challenge could be as simple as presenting the disposable address as an image (that spammers will find hard to work around but is intuitive to users). The sender also will be provided with instructions on how to resend the email. With the disposable address, the sender opens the original email (possibly included with the address generation server response) and forwards it to the disposable address, which may be added to the sender's address book for future reference.

In the case of email from an incompatible client and a compatible server, the client's server can negotiate for a disposable address from the recipient's address generation server for each individual communication. As appropriate, the server may cache IDEAs for subsequent use. The server also translates the disposable address into an IDEA (in the address fields) for the client to see. Similarly, in the case of email from a compatible client and an incompatible server, the client can perform the handshake directly (through email) with the recipient's address generation server. The client can automatically solve a computational challenge and resend the messages. Here too, the client may cache disposable email addresses for an IDEA or add the disposable email addresses to the sender's address book for future reference, as appropriate. The client may then automatically replace an IDEA in composed messages with the corresponding disposable address. Of course, each of the foregoing descriptions represents one of many possible example implementations, none of which should be construed as necessarily limiting the scope of the present invention.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 3A:
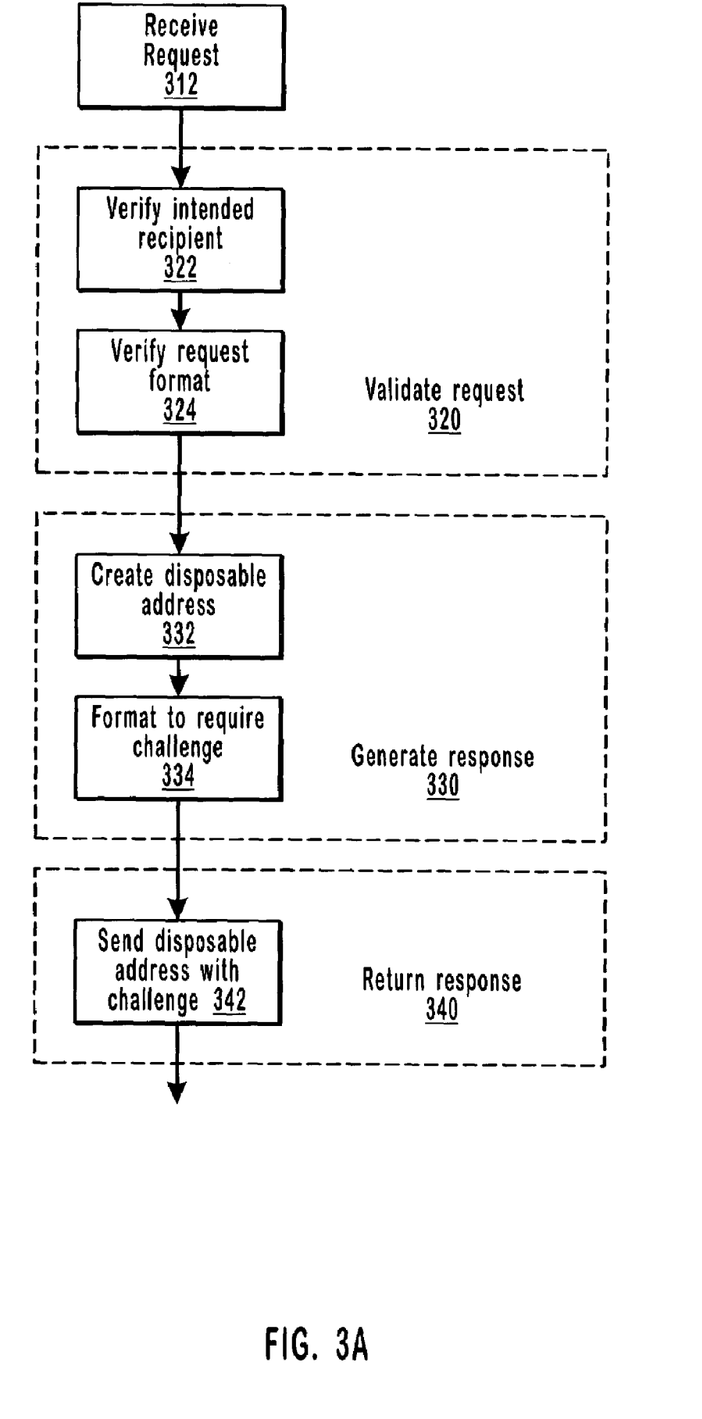
FIGS. 3A-3B show example acts and steps for methods of reducing unsolicited electronic messages in accordance with the present invention.
Figure 3B:
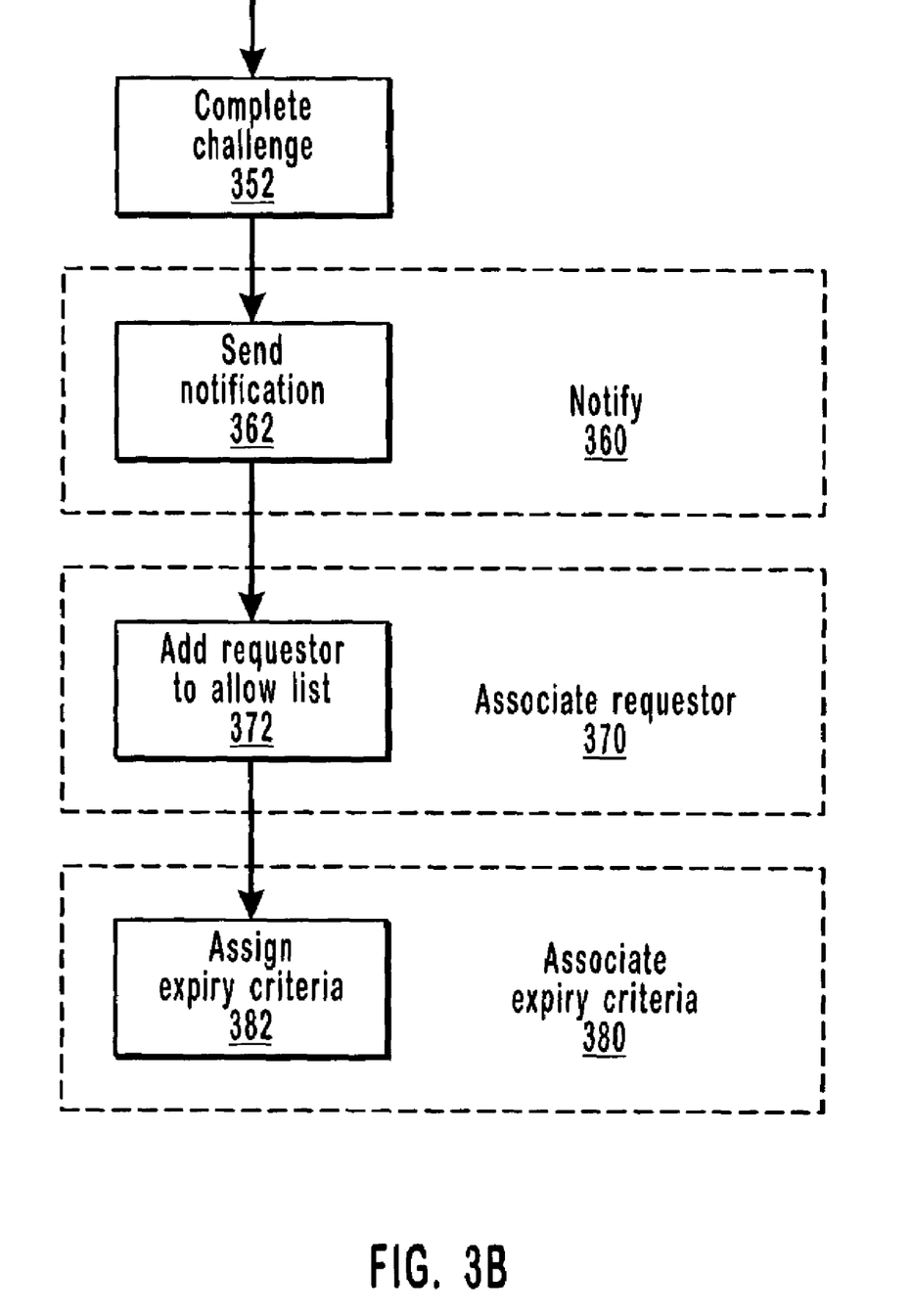

Specifically, FIGS. 3A-3B show example acts and steps for methods of reducing unsolicited electronic messages in accordance with the present invention. From the perspective of an address generation server, the process begins with an act of receiving (312) a request. As indicated above, the request may take any of many forms that are suitable for exchanging electronic messages. A step for validating (320) the request may include acts of verifying (322) that the intended recipient is known and authorized to use disposable addresses or authorized to have additional disposable addresses generated, and may include an act of verifying (324) the format of the request, such as verifying that the sender is identified and verifying that the request represents a valid request for a disposable electronic address.

A step for generating (330) a response to the request may include an act of creating (332) a disposable address and an act of formatting (334) the response or address to require a challenge. A step for returning (340) the response may include an act of sending (342) the disposable address with the challenge to the requestor or sender. After receiving the response, the sender or requester completes (352) the challenge so that the disposable address may be used for sending electronic messages to the intended recipient.

A step for notifying (360) the intended recipient about the request for a disposable address may include an act of sending (362) a notification message. A step for associating (370) the requester with the disposable address may include an act of adding (372) the requestor to an allow list. A step for associating (380) expiry criteria with the disposable address may include an act of assigning (382) the expiry criteria to the disposable address. Initial allow/deny lists and expiry criteria may be created at the address generation server and then later modified by the intended recipient.

Embodiments within the scope of the present invention also include computerreadable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hard wired, wireless, or a combination of hard wired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
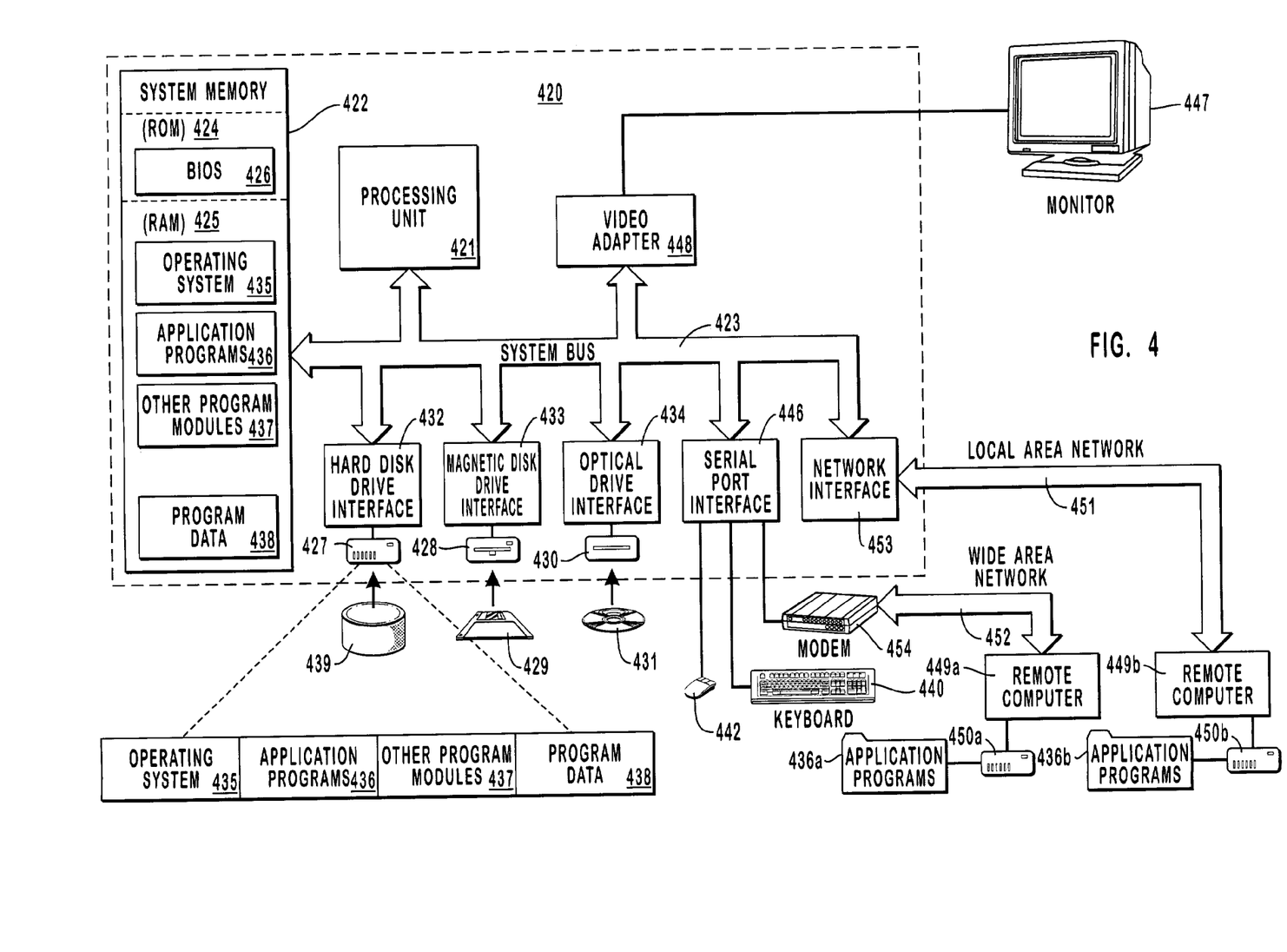
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. That perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hard wired links, wireless links, or by a combination of hard wired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a network ed environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a PLAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a network ed environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system for exchanging electronic messages between senders and recipients, a method of reducing unsolicited electronic messages for a recipient by creating one or more disposable electronic messages to avoid the need for sharing one or more permanent electronic message addresses and by requiring the completing of one or more configurable anti-spam challenges before the disposable electronic message may be used, the method comprising acts of:

receiving at an address generation server, an electronic message comprising a request address for identifying an intended recipient and a return electronic message address corresponding to a sender of the received electronic message;

verifying that the intended recipient identified by the request address is known to the address generation server;

formulating a configurable anti-spam challenge configurable to include a variable type or number of challenges such that when answered correctly, gives an increased assurance that the sender is not sending spam;

creating a disposable electronic message address for the intended recipient, wherein the disposable electronic message address is formatted so as to require completion of the configurable anti-spam challenge before the disposable electronic message address may be used; and sending the disposable electronic message address to the return electronic message address included in the received electronic message so that the sender may use the electronic message address to send one or more electronic messages to the intended recipient;

adding the return electronic message address to an allow list associated with the disposable electronic message address to indicate that electronic messages received from the return electronic message address are authorized to use the disposable electronic message address;

addressing the electronic message to one or more recipients other than the intended recipient; and adding an electronic address of the one or more other recipients other than the intended recipient to the allow list.

2. For a system that exchanges electronic message between senders and recipients, a computer program product comprising one or more computer readable media carrying computer executable instructions that implement a method of reducing unsolicited electronic messages for a recipient by creating one or more disposable electronic message addresses to avoid the need for sharing one or more permanent electronic message addresses and by requiring the completion of one or more anti-spam challenges before the disposable electronic message address may be used, the method comprising the acts of:

receiving at an address generation server, an electronic message comprising a request address for identifying an intended recipient and a return electronic message address corresponding to a sender of the received electronic message;

verifying that the intended recipient identified by the request address is known to the address generation server;

formulating a configurable anti-spam challenge configurable to include a variable type or number of challenges such that when answered correctly, gives an increased assurance that the sender is not sending spam;

creating a disposable electronic message address for the intended recipient, wherein the disposable electronic message address is formatted so as to require completion of the configurable anti-spam challenge before the disposable electronic message address may be used; and sending the disposable electronic message address to the return electronic message address included in the received electronic message so that the sender may use the electronic message address to send one or more electronic messages to the intended recipient;

adding the return electronic message address to an allow list associated with the disposable electronic message address to indicate that electronic messages received from the return electronic message address are authorized to use the disposable electronic message address;

addressing the electronic message to one or more recipients other than the intended recipient; and adding an electronic address of the one or more other recipients other than the intended recipient to the allow list.

3. In a client system that connects to an electronic messaging system for exchanging electronic messages between senders and recipients, a method of sending an electronic message to a recipient without knowing the recipient's one or more actual electronic message addresses, thereby allowing the recipient to reduce unsolicited electronic messages sent to the recipient, the method comprising acts of:

sending an initial electronic message to an address generation server, the initial electronic message comprising an address identifying the intended recipient, a return address for a sender of the electronic message, and an electronic address of one or more other recipients other than the intended recipient;

receiving a response from the address generation server that includes a disposable electronic message address for the intended recipient and a configurable anti-spam challenge to be completed prior to using the disposable electronic message address formulated such that, when answered correctly, the configurable anti-spam challenge is designed to give an increased assurance that the sender is not sending spam, the anti-spam challenge being configurable to include a variable type or number of challenges to reduce unsolicited electronic messages;

completing the anti-spam challenge received in the response;

receiving an indication that the address generation server has added the return electronic message address to an allow list associated with the disposable electronic message address to indicate that electronic messages received from the return electronic message address are authorized to use the disposable electronic message address;

receiving an indication that the electronic address of the one or more other recipients other than the intended recipient have been added to the allow list; and sending one or more subsequent electronic messages to the intended recipient using the disposable electronic message address.

4. A method as recited in claim 3, wherein the initial electronic message comprises at least one or an electronic mail message and a World Wide Web request.

5. A method as recited in claim 3, wherein the initial electronic message comprises a header identifying the initial electronic message as a request for the disposable electronic message address of the intended recipient.

6. A method as recited in claim 3, wherein the anti-spam challenge comprises at least one of a computational challenge, a monetary challenge, and a human challenge.

7. For a client system that connects to an electronic messaging system for exchanging electronic messages between senders and recipients, a computer program product comprising one or more computer readable media carrying computer executable instructions for implementing a method of sending an electronic message to a recipient without knowing the recipient's one or more actual electronic message addresses, thereby allowing the recipient to reduce unsolicited electronic messages sent to the recipient, the method comprising acts of:
sending an initial electronic message to an address generation server, the initial electronic message comprising an address identifying the intended recipient, a return address for a sender of the electronic message, and an electronic address of one or more other recipients other than the intended recipient;
receiving a response from the address generation server that includes a disposable electronic message address for the intended recipient and a configurable anti-spam challenge to be completed prior to using the disposable electronic message address formulated such that, when answered correctly, the configurable anti-spam challenge is designed to give an increased assurance that the sender is not sending spam, the anti-spam challenge being configurable to include a variable type or number of challenges to reduce unsolicited electronic messages;
completing the anti-spam challenge received in the response;
receiving an indication that the address generation server has added the return electronic message address to an allow list associated with the disposable electronic message address to indicate that electronic messages received from the return electronic message address are authorized to use the disposable electronic message address;
receiving an indication that the electronic address of the one or more other recipients other than the intended recipient have been added to the allow list; and
sending one or more subsequent electronic messages to the intended recipient using the disposable electronic message address.

8. The method of claim 7, wherein the initial electronic message comprises at least one or an electronic mail message and a World Wide Web request.

9. The method of claim 7, wherein the initial electronic message comprises a header identifying the initial electronic message as a request for the disposable electronic message address of the intended recipient.

10. The method of claim 7, wherein the anti-spam challenge comprises at least one of a computational challenge, a monetary challenge, and a human challenge.

11. In a system for exchanging electronic messages between senders and recipients, a method of reducing unsolicited electronic messages for a recipient by creating one or more disposable electronic message addresses to avoid the need for sharing one or more permanent electronic message addresses, the method comprising the acts of:
receiving at an address generation server, an electronic message comprising a request address for identifying an intended recipient and one or more recipients other than the intended recipient, a return electronic message address corresponding to a sender of the received electronic message, and an electronic address of one or more other recipients other than the intended recipient;
verifying that the intended recipient identified by the request address is known to the address generation server;
creating a disposable electronic message address for the intended recipient, wherein the disposable electronic message address is formatted so as to require a challenge of some form before the disposable electronic message address may be used, the challenge discouraging use of the disposable electronic message address for sending unsolicited electronic messages;
sending the disposable electronic message address to the return electronic message address included in the received electronic message so that the sender may use the disposable electronic message address to send one or more electronic messages to the intended recipient;
adding the return electronic message address to an allow list associated with the disposable electronic message address to indicate that electronic messages received from the return electronic message address are authorized to use the disposable electronic message address; and
adding an electronic address of the one or more other recipients other than the intended recipient to the allow list.

12. A method as recited in claim 11, wherein the electronic message comprises an electronic mail message.

13. A method as recited in claim 11, wherein the electronic mail message is initiated in response to a user selecting a "mailfor" uniform resource identifier in a web document.

14. A method as recited in claim 11, wherein the disposable address comprises a globally unique identifier.

15. A method as recited in claim 11, wherein the return electronic mail address represents a request for a disposable electronic message address corresponding to the sender, the method further comprising acts of:
receiving a sender's anti-spam challenge in response to sending the created disposable electronic message address to the return electronic message address included in the received electronic message;
completing the sender's anti-spam challenge to obtain a disposable electronic message addressed for the sender; and
sending the disposable electronic message address, created in response to the received electronic message, to the disposable electronic message address obtained for the sender by completing the received anti-spam challenge.

16. A method as recited in claim 11, wherein the address generation server comprises an electronic message server that receives and processes electronic messages directed to the disposable electronic message address created for the intended recipient.

17. A method as recited in claim 11, wherein the received electronic message comprises a header identifying the received electronic message as a request for the disposable electronic message address of the intended recipient.

18. A method as recited in claim 11, further comprising an act of sending a notification to the intended recipient that the electronic message for requesting the disposable electronic message address was received by the address generation server.

19. A method as recited in claim 11, further comprising an act of adding the return electronic message address to an allow list associated with the disposable electronic message address to indicate that electronic messages received from the return electronic message address are authorized to use the disposable electronic message address.

20. A method as recited in claim 19, wherein the electronic message is electronically addressed to one or more recipients other than the intended recipient, the method further comprising an act of adding an electronic address of the one or more other recipients to the allow list.

21. A method as recited in claim 11, wherein the anti-spam challenge comprises at least one of a computational challenge, a monetary challenge, and a human challenge.

22. A method as recited in claim 11, wherein the electronic message is received from an electronic message server that receives electronic message directed to on or more disposable electronic message addresses created for the intended recipient because the sender identified by the return electronic message address is not authorized to use a previously created disposable electronic message address to which the electronic message was directed.

23. A method as recited in claim 11, further comprising an act of assigning one or more expiry criteria to the disposable electronic message address.

24. A method as recited in claim 23, wherein the expiry criteria comprises at least one of a received electronic message count, an expiration time, and an inactivity time.

25. A method as recited in claim 11, wherein the return electronic message address is determined to be associated with a sender of unsolicited email, and wherein the disposable electronic message address is a null address at which received electronic messages are automatically deleteable, without interaction from the intended recipient.

26. A method as recited in claim 11, wherein the electronic message comprises at least one or an electronic mail message and a World Wide Web request.

27. A method as recited in claim 11, wherein the request is received by address generation server that is separate from an electronic message server for receiving electronic messages that are directed to the disposable electronic message address for the intended recipient.

28. For a system that exchanges electronic messages between senders and recipients, a computer program product comprising one or more computer readable media carrying computer executable instructions that implement a method of reducing unsolicited electronic messages for a recipient by creating one or more disposable electronic message addresses to avoid the need for sharing one or more permanent electronic message addresses, the method comprising acts of:

receiving at an address generation server, an electronic message comprising a request address for identifying an intended recipient and one or more recipients other than the intended recipient, a return electronic message address corresponding to a sender of the received electronic message, and an electronic address of one or more other recipients other than the intended recipient;

verifying that the intended recipient identified by the request address is known to the address generation server;

creating a disposable electronic message address for the intended recipient, wherein the disposable electronic message address is formatted so as to require a challenge of some form before the disposable electronic message address may be used, the challenge discouraging use of the disposable electronic message address for sending unsolicited electronic messages;

sending the disposable electronic message address to the return electronic message address included in the received electronic message so that the sender may use the disposable electronic message address to send one or more electronic messages to the intended recipient;

adding the return electronic message address to an allow list associated with the disposable electronic message address to indicate that electronic messages received from the return electronic message address are authorized to use the disposable electronic message address; and adding an electronic address of the one or more other recipients other than the intended recipient to the allow list.

29. The method of claim 28, wherein the electronic message comprises an electronic mail message.

30. The method of claim 29, wherein the electronic mail message is initiated in response to a user selecting a "mailfor" uniform resource identifier in a web document.

31. The method of claim 28, wherein the return electronic mail address represents a request for a disposable electronic message address corresponding to the sender, the method further comprising acts of:

receiving a sender's anti-spam challenge in response to sending the created disposable electronic message address to the return electronic message address included in the received electronic message;

completing the sender's anti-spam challenge to obtain a disposable electronic message addressed for the sender; and sending the disposable electronic message address, created in response to the received electronic message, to the disposable electronic message address obtained for the sender by completing the received anti-spam challenge.

32. The method of claim 28, wherein the address generation server comprises an electronic message server that receives and processes electronic messages directed to the disposable electronic message address created for the intended recipient.

33. The method of claim 28, further comprising an act of sending a notification to the intended recipient that the electronic message for requesting the disposable electronic message address was received by the address generation server.

34. The method of claim 28, further comprising an act of adding the return electronic message address to an allow list associated with the disposable electronic message address to indicate that electronic messages received from the return electronic message address are authorized to use the disposable electronic message address.

35. The method of claim 34, wherein the electronic message is electronically addressed to one or more recipients other than the intended recipient, the method further comprising an act of adding an electronic address of the one or more other recipients to the allow list.

36. The method of claim 28, wherein the anti-spam challenge comprises at least one of a computational challenge, a monetary challenge, and a human challenge.

37. The method of claim 28, the method further comprising an act of assigning one or more expiry criteria to the disposable electronic message address.

38. The method of claim 28, wherein the return electronic message address is determined to be associated with a sender of unsolicited email, and wherein the disposable electronic message address is a null address at which received electronic messages may be deleted automatically, without interaction from the intended recipient.

39. The method of claim 28, wherein the address generation server receives the electronic message from another server.

* * * * *